(12) United States Patent
Recio, III et al.

(10) Patent No.: US 11,566,169 B2
(45) Date of Patent: Jan. 31, 2023

(54) RAPID REVERSAL OF WETTABILITY OF SUBTERRANEAN FORMATIONS

(71) Applicant: Halliburton Energy Services, Inc., Houston, TX (US)

(72) Inventors: Antonio Recio, III, Humble, TX (US); Aaron Michael BeuterBaugh, Spring, TX (US); Denise Nicole Benoit, Houston, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/274,699

(22) PCT Filed: Nov. 13, 2018

(86) PCT No.: PCT/US2018/060707
§ 371 (c)(1),
(2) Date: Mar. 9, 2021

(87) PCT Pub. No.: WO2020/101649
PCT Pub. Date: May 22, 2020

(65) Prior Publication Data
US 2022/0049154 A1    Feb. 17, 2022

(51) Int. Cl.
*C09K 8/68* (2006.01)
*C09K 8/60* (2006.01)
(Continued)

(52) U.S. Cl.
CPC ............... *C09K 8/68* (2013.01); *C09K 8/602* (2013.01); *E21B 43/26* (2013.01)

(58) Field of Classification Search
CPC ........ C09K 8/584; C09K 8/594; C09K 8/588; C09K 8/64; C09K 8/86; C09K 8/82;
(Continued)

(56) References Cited

U.S. PATENT DOCUMENTS

2009/0281004 A1    11/2009  Ali
2012/0285694 A1 *  11/2012  Morvan ................ C09K 8/594
                                                166/309
(Continued)

FOREIGN PATENT DOCUMENTS

WO    WO-2017035040 A1 *  3/2017  .............. C09K 8/40
WO    WO-2017052537 A1 *  3/2017  .............. C04B 28/02
(Continued)

OTHER PUBLICATIONS

International Search Report and Written Opinion issued in PCT/US2018/060707 dated Aug. 13, 2019.
(Continued)

*Primary Examiner* — Zakiya W Bates
(74) *Attorney, Agent, or Firm* — McAfee & Taft

(57) ABSTRACT

A well treatment fluid comprising an aqueous base fluid and a wettability modifier, and a method using the well treatment fluid. The wettability modifier includes an alkylamine oxide surfactant, and an organic compound having a phosphonoalkyl moiety. As an example, the well treatment fluid is suitable for treating oil-wet formations.

18 Claims, 3 Drawing Sheets

(51) Int. Cl.
*E21B 43/26* (2006.01)
*E21B 43/22* (2006.01)

(58) Field of Classification Search
CPC .. C09K 8/52; C09K 8/74; E21B 43/26; E21B 43/267; E21B 43/16
See application file for complete search history.

(56) References Cited

U.S. PATENT DOCUMENTS

| | | |
|---|---|---|
| 2016/0060500 A1 | 3/2016 | Kefi |
| 2016/0138364 A1 | 5/2016 | Gamage |

FOREIGN PATENT DOCUMENTS

| | | |
|---|---|---|
| WO | 2017/099709 A1 | 6/2017 |
| WO | 2017151159 A1 | 9/2017 |
| WO | 2017171731 A1 | 10/2017 |
| WO | 2018203884 A1 | 11/2018 |

OTHER PUBLICATIONS

Office Action issued in corresponding Canadian application No. 3,106,979, dated Apr. 4, 2022.

\* cited by examiner

RAPID REVERSAL OF WETTABILITY OF SUBTERRANEAN FORMATIONS

BACKGROUND

Well treatment fluids are introduced into a subterranean formation through a wellbore of an oil and gas well in connection with a variety of treatment operations including, for example, drilling operations, cementing operations, completion operations and stimulation and recovery operations. The components of a particular well treatment fluid and the resulting properties thereof will vary depending on the application, well conditions and other factors known to those skilled in the art.

An example of one type of well treatment fluid is a hydraulic fracturing fluid. In a hydraulic fracturing operation, a fracturing fluid is pumped into a subterranean formation at or above a pressure sufficient to form or extend one or more fractures in the formation. Proppant particulates are carried by the fracturing fluid and placed in the fracture(s) to hold the fracture(s) open once the hydraulic pressure on the formation is released. The resulting propped fracture(s) provides one or more conductive channels through which fluids in the formation can flow from the formation to the wellbore.

Surfactants are added to well treatment fluids for a large variety of reasons. The type surfactant(s) used and the function(s) thereof vary depending on the application. For example, surfactants are often included in hydraulic fracturing fluids to function as flowback additives, that is, additives that function to reduce capillary pressure and water blocks (retained water) in the formation that would otherwise potentially inhibit the flow of oil, or gas, from the formation to the wellbore. Maximizing or enhancing the flowability of oil in the reservoir can ultimately increase the production of oil from the well.

Although most surfactants (including flowback additives) are effective in water-wet formations, it has been discovered that many surfactants and surfactant formulations (including flowback additives) do not perform well in oil-wet formations, such as oil-wet calcite (calcium carbonate)-containing formations. Furthermore, over the life of a well in a calcite-containing formation, proppant packs and even microfractures in the formation may become oil-wet as organic content (enriched with chemical compounds that are significantly distinct from the saturated hydrocarbons naturally present in the formation) is leached from the formation due to closure stresses and changes in temperature.

For example, when a crude oil-saturated formation exhibits a water-wet character, water is the wetting phase and oil is the non-wetting phase, which allows water to displace oil from the formation. Conversely, if a crude oil-saturated formation exhibits an oil-wet character, oil is the wetting phase and water is the non-wetting phase. Under oil-wet conditions, water does not always provide a force sufficient to overcome the adhesion forces associated with the formation pore surface and crude oil and thereby displace oil from the formation.

There is a need for a surfactant formulation that effectively functions in oil-wet formations. For example, there is a need for a surfactant formulation that effectively functions as a flowback additive in oil-wet formations.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

DETAILED DESCRIPTION

Figure 1:
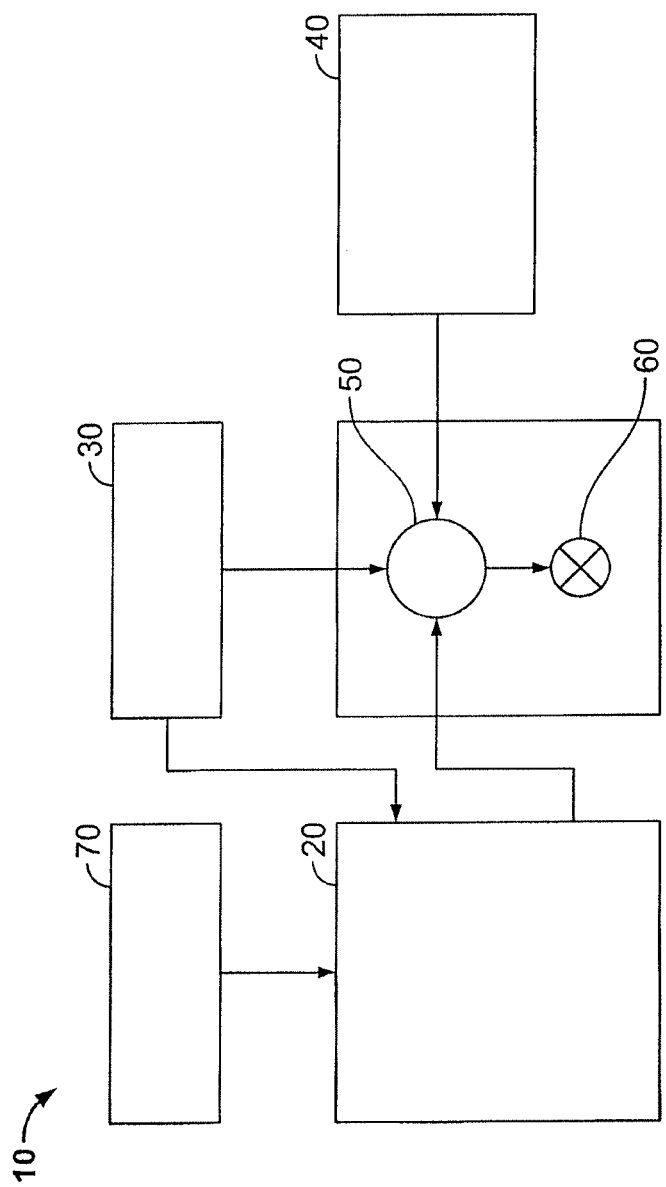
FIG. 1 is a diagram illustrating an example of a fracturing system that can be used in accordance with certain embodiments of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

As used herein and in the appended claims, the following terms and phrases have the corresponding definitions set forth below.

A "well" means a wellbore extending into the ground and a subterranean formation penetrated by the wellbore.

A "well treatment fluid" means any fluid that is introduced into a well to treat the well or the formation.

An "oil-wet formation" means a formation in which the rock has an affinity for an oil phase as opposed to a water phase or hydrophilic medium. For example, in an oil-wet reservoir, the reservoir rock surface preferentially contacts oil when oil and water are both present. Oil-wet rocks preferentially imbibe oil as opposed to water. For example, oil-wet rock surfaces can have a contact angle, $\theta$, greater than 80°, as measured using the sessile drop or rising bubble techniques or as suggested by spontaneous imbibition studies. The contact angle is the angle conventionally measured through the most dense fluid phase, where a liquid-vapor interface or liquid-liquid interface meets a solid.

A "water-wet formation" means a formation in which the rock has an affinity for a water phase or hydrophilic medium as opposed to an oil phase or a hydrophobic medium. For example, in a water-wet reservoir, the reservoir rock surface preferentially contacts water when oil and water are both present. Water-wet rocks preferentially imbibe water as opposed to oil. For example, water-wet rock surfaces can have a contact angle, $\theta$, less than 80°, as measured using the sessile drop or rising bubble techniques or as suggested by spontaneous imbibition studies.

An "oil-wet calcite formation" means an oil-wet formation that has a calcium carbonate content of greater than 1% by weight based on the total weight of the minerals in the formation. For example, forms and phases of carbonate minerals include dolomite, siderite, ankerite, calcite, and aragonite.

A "wettability modifier" means a combination of one or more components capable of altering the wettability of a subterranean formation.

Whenever a range is disclosed herein, the range includes independently and separately every member of the range extending between any two numbers enumerated within the range. Furthermore, the lowest and highest numbers of any range shall be understood to be included within the range set forth. Additionally, whenever the term "C (alkyl range)" is used, the term independently includes each member of that class as if specifically and separately set out.

Unless otherwise specified, the term "alkyl," as used alone or in combination, means a saturated linear or branched primary, secondary, or tertiary hydrocarbon having from 1 to 10 carbon atoms, including, but not limited to methyl, ethyl, propyl, isopropyl, butyl, isobutyl, t-butyl, and sec-butyl groups. The "alkyl" group may be optionally substituted where possible with any moiety, including but not limited to halo, haloalkyl, hydroxyl, carboxyl, acyl, aryl, acyloxy, amino, amido, carboxyl derivative, alkylamino, dialkylamino, phosphonoalkylamino, arylamino, alkoxy, aryloxy, nitro, cyano, sulfonic acid, thiol, imine, sulfonyl, sulfanyl, sulfinyl, sulfamonyl, ester, carboxylic acid, amide, phosphonyl, phosphinyl, phosphoryl, phosphine, thioester, thioether, acyl halide, anhydride, oxime, hydrazine, carbamate, phosphonic acid, phosphonate, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art.

Unless otherwise specified, the term "alkenyl," as used alone or in combination, means a cyclic or non-cyclic alkyl of 2 to 10 carbon atoms having one or more unsaturated carbon-carbon bonds. The "alkenyl" group may be optionally substituted where possible with any moiety, including but not limited to halo, haloalkyl, hydroxyl, carboxyl, acyl, aryl, acyloxy, allyl, amino, amido, carboxyl derivative, alkylamino, dialkylamino, phosphonoalkylamino, arylamino, alkoxy, aryloxy, nitro, cyano, sulfonic acid, thiol, imine, sulfonyl, sulfanyl, sulfinyl, sulfamonyl, ester, carboxylic acid, amide, phosphonyl, phosphinyl, phosphoryl, phosphine, thioester, thioether, acyl halide, anhydride, oxime, hydrazine, carbamate, phosphonic acid, phosphonate, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art.

Unless otherwise specified, the term "alkynyl," as used alone or in combination, means a cyclic or non-cyclic alkyl of 2 to 10 carbon atoms having one or more triple carbon-carbon bonds, including but not limited to ethynyl and propynyl. The "alkynyl" group may be optionally substituted where possible with any moiety, including but not limited to halo, haloalkyl, hydroxyl, carboxyl, acyl, aryl, acyloxy, amino, amido, carboxyl derivative, alkylamino, dialkylamino, phosphonoalkylamino, arylamino, alkoxy, aryloxy, nitro, cyano, sulfonic acid, thiol, imine, sulfonyl, sulfanyl, Sulfinyl, sulfamonyl, ester, carboxylic acid, amide, phosphonyl, phosphinyl, phosphoryl, phosphine, propargyl, thioester, thioether, acyl halide, anhydride, oxime, hydrazine, carbamate, phosphonic acid, phosphonate, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art.

Unless otherwise specified, the term "aryl," as used alone or in combination, means an aromatic system containing one, two, or three [hetero-aromatic] rings wherein such rings may be attached together in a pendant manner or may alternatively be fused. The "aryl" group can be optionally substituted where possible with any moiety, including but not limited to alkyl, alkenyl, alkynyl, allyl, benzoyl, benzyl, heteroaryl, heterocyclic, carbocycle, alkoxy, oxo, aryloxy, arylalkoxy, cycloalkyl, tetrazolyl, heteroaryloxy; heteroaryl alkoxy, carbohydrate, amino acid, amino acid esters, amino acid amides, alditol, halogen, haloalkylthio, haloalkoxy, haloalkyl, hydroxyl, carboxyl, acyl, acyloxy, amino, aminoalkyl, aminoacyl, amido, alkylamino, dialkylamino, arylamino, propargyl, nitro, cyano, thiol, imide, sulfonic acid, sulfate, sulfonate, sulfonyl, alkyl sulfonyl, aminosulfonyl, alkylsulfonylamino, haloalkylsulfonyl, sulfanyl, sulfinyl, sulfamoyl, carboxylic ester, carboxylic acid, amide, phosphonyl, phosphinyl, phosphoryl, thioester, thioether, oxime, hydrazine, carbamate, phosphonic acid, phosphate, phosphonate, phosphinate, sulfonamido, carboxamido, hydroxamic acid, sulfonylimide, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art. In addition, adjacent groups on an "aryl" ring may combine to form a 5- to 7-membered saturated or partially unsaturated carbocyclic, aryl, heteroaryl or heterocyclic ring, which in turn may be substituted.

Unless otherwise specified, the term "acyl," as used alone or in combination, means a group of the formula "—C(O)R'," wherein R' is an alkyl, alkenyl, allyl, alkynyl, aryl, aralkyl, or propargyl group.

The terms and formulas "carboxy," "COOH," and "C(O)OH" are used interchangeably within the present disclosure.

The term "amino" as used herein, alone or in combination, means a group of the formula NR'R", wherein R' and R" are independently selected from a group consisting of a bond, hydrogen, alkyl, aryl, alkaryl, aralkyl, alkenyl, allyl, alkynyl, and propargyl wherein the alkyl, aryl, alkaryl, aralkyl alkenyl, allyl, alkynyl, and propargyl may be optionally substituted where possible as defined above.

As used herein, when a compound is described as being "metallated," the metal can be selected from sodium, potassium, lithium, cesium, beryllium, calcium, strontium, magnesium, barium, titanium, zirconium, chromium, iron, manganese, nickel, copper, gallium, indium and aluminum.

Reference to a certain Group of metals (for example, a Group one metal," "a Group twelve metal," etc.) means reference to such Group as set forth in the Periodic Table of the Elements.

A "flowback additive" means an additive that enhances the ability of one or more hydrocarbons (for example, oil and/or natural gas) oil to flow into the wellbore.

The phrase "forming a fracture in the formation" means forming a new fracture or network of fractures, or expanding an existing fracture or network of fractures in the formation.

In accordance with the present disclosure, a method of treating a well and a well treatment fluid are provided. For example, a well can be an oil well, a natural gas well, a water well or any combination thereof. For example, the well can be an oil and gas well. For example, the well can be an oil well. Examples of well treatment fluids encompassed by the present disclosure include aqueous injection fluids, drilling muds and other drilling fluids, aqueous pre-flush fluids, aqueous cement compositions, aqueous completion fluids, aqueous work-over fluids, aqueous fracturing fluids, aqueous acidizing fluids and other aqueous stimulation fluids.

The method of treating a well disclosed herein comprises introducing a well treatment fluid through a wellbore into the subterranean formation. For example, the formation can be an oil-wet formation. For example, the formation can be an oil-wet calcite formation. For example, the formation can have a calcium carbonate content of greater than 40% by weight based on the total weight of the minerals in the formation. For example, the formation can have a calcium carbonate content of greater than 50% by weight based on the total weight of the minerals in the formation.

The well treatment fluid used in the method disclosed herein includes an aqueous base fluid and a wettability modifier. Optionally, and depending on the application, the well treatment fluid can include one or more additional components as well.

For example, the aqueous base fluid can be water. The water can be fresh water, sea water, brackish water, brine, produced water, formation water, treated flowback water, and mixtures thereof.

The wettability modifier of the well treatment fluid includes an alkylamine oxide surfactant, and an organic compound having a phosphonoalkyl moiety.

For example, the alkylamine oxide surfactant can be selected from the group of an alkoxylated amine, an alkoxylated alkyl alcohol, an alkoxylated ester, an alkoxylated resin, an alkoxylated alkylphenol, an alkoxylated polyol, an alkoxylated phosphonate, an alkoxylated siloxane, an alkoxylated sorbitan, an alkoxylated palmitic acid, and mixtures thereof. For example, the alkylamine oxide surfactant can be an alkoxylated amine. For example, the alkylamine oxide surfactant can be an alkylamido amine oxide.

An example of an alkylamido amine oxide is lauryl/myristyl amidopropyl amine oxide, as shown by formula (1) below:

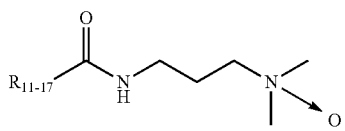

(1)

For example, the organic compound having a phosphonoalkyl moiety can have the structural formula (2) below:

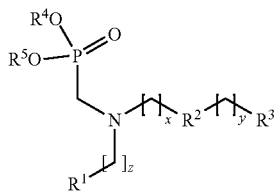

(2)

wherein:
$R^1$ is selected from the group of an alkyl having from 1 to 10 carbon atoms, an alkenyl having from 1 to 10 carbon atoms, an alkynyl having from 1 to 10 carbon atoms, an acyl, an aryl, an acetate, a phosphonate, and a hydrogen atom;
$R^2$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl amine, and a hydrogen atom;
$R^3$ is selected from the group of an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl amine, and a hydrogen atom;
$R^4$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a hydrogen atom, a Group 1 metal selected from lithium, sodium, potassium, rubidium, and cesium, a Group 2 metal selected from calcium, magnesium, beryllium, strontium, and barium, a transition metal within Group 3 through Group 12 where the metal can be one of any a divalent metal, a trivalent metal, or a tetravalent metal, a Group 13 or Group 14 metal selected from aluminum, gallium, indium, and tin, an ammonium, and a quaternary ammonium salt;
$R^5$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a hydrogen atom, a Group 1 metal selected from lithium, sodium, potassium, rubidium, and cesium, a Group 2 metal selected from calcium, magnesium, beryllium, strontium, and barium, a transition metal within Group 3 through Group 12 where the metal can be one of any a divalent metal, a trivalent metal, or a tetravalent metal, a Group 13 or Group 14 metal selected from aluminum, gallium, indium, and tin, an ammonium, and a quaternary ammonium salt;
x is 1 to 6;
y is 0 to 6; and
z is 0 to 6.

Alternatively, for example, the organic compound having a phosphonoalkyl moiety can have the structural formula (3) below:

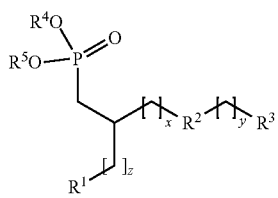

(3)

wherein:
$R^1$ is selected from the group of an alkyl having from 1 to 10 carbon atoms, an alkenyl having from 1 to 10 carbon atoms, an alkynyl having from 1 to 10 carbon atoms, an acyl, an aryl, an acetate, a phosphonate, and a hydrogen atom;

$R^2$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl amine, and a hydrogen atom;

$R^3$ is selected the group of from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl amine, and a hydrogen atom;

$R^4$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a hydrogen atom, a Group 1 metal selected from lithium, sodium, potassium, rubidium, and cesium, a Group 2 metal selected from calcium, magnesium, beryllium, strontium, and barium, a transition metal within Group 3 through Group 12 where the metal can be one of any a divalent metal, a trivalent metal, or a tetravalent metal, a Group 13 or Group 14 metal selected from aluminum, gallium, indium, and tin, an ammonium, and a quaternary ammonium salt;

$R^5$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a hydrogen atom, a Group 1 metal selected from lithium, sodium, potassium, rubidium, and cesium, a Group 2 metal selected from calcium, magnesium, beryllium, strontium, and barium, a transition metal within Group 3 through Group 12 where the metal can be one of any a divalent metal, a trivalent metal, or a tetravalent metal, a Group 13 or Group 14 metal selected from aluminum, gallium, indium, and tin, an ammonium, and a quaternary ammonium salt;

x is 1 to 6;
y is 0 to 6; and
z is 0 to 6.

For example, the organic compound having a phosphonoalkyl moiety can have a nitrogen-containing functional group attached thereto.

For example, the organic compound can be a phosphorus compound selected from the group of phosphonic acids, salts of phosphonic acids, and mixtures thereof. For example, the phosphorus compound can be selected from the group of an aminophosphonic acid, a salt of an aminophosphonic acid, a metallated phosphonic acid, a metallated aminophosphonic acid, an ammonium salt of any preceding group member, a quaternary ammonium salt of any preceding group member, and a tertiary ammonium salt of any preceding group member. For example, the phosphorus compound can be selected from the group of alkyl aminophosphonates, polyaminopolyphosphonates, N-(phosphonoalkyl)iminodiacetic acids, N-(phosphonoalkyl)iminodiacetates, metallated (phosphonoalkyl)iminodiacetic acids, metallated N-(phosphonoalkyl)iminodiacetates, and mixtures thereof.

For example, the phosphorus compound can be selected from the group of an N-(phosphonomethyl)iminodiacetate, a metallated-N-(phosphonomethyl)iminodiacetate, and a mixture thereof.

For example, the organic compound can be selected from the group of phosphonobutane tricarboxylic acid, 2-hydroxyphosphono dicarboxylic acid, and mixtures thereof.

For example, the phosphorus compound can be selected from the group of N-(phosphonoalkyl)iminodiacetic acids, N-(carboxymethyl)-N-(phosphonomethyl)glycine, glycine, N,N'-1,2-ethanediylbis(N-(phosphonomethyl), glyphosine; aminotrimethylene phosphonic acid, sodium aminotris(m-ethylenephosphonate), N-(2-hydroxyethyl)iminobis(methylphosphonic acid), phosphonic acid, P,P'-((2-propen-1-ylimino)bis(methylene))bis-; phosphonic acid, P,P',P"-(nitrilotris(methylene))tris-; (nitrilotris(methylene)) trisphosphonic acid; ((methylimino)-dimethylene) bisphosphonic acid; phosphonic acid, P,P',P''',P''''-(oxybis(2,1-ethanediylnitrilobis-(methylene))tetrakis-; ((propylimino) bis(methylene))diphosphonic acid; phosphonic acid, P,P',P"-(nitrilotris(methylene))tris-; (ethylenedinitrilo)-tetramethylenephosphonic acid; ethylene-bis (nitrilodimethylene)tetraphosphonic acid; (ethylenebis (nitrilobis(methylene)))tetrakisphosphonic acid; tetrasodium tetrahydrogen (ethane-1,2-diylbis(nitrilobis (methylene)))tetrakisphosphonate; 6-(bis(phosphonomethyl)amino)hexanoic acid; (phenylmethyl)imino)bis-(methylene)bisphosphonic acid; a sodium, potassium, or ammonium salt of any group member herein, and mixtures thereof.

For example, the wettability modifier can include lauramine oxide and N-(phosphonomethyl)iminodiacetic acid sodium salt. As another specific example, the wettability modifier can include lauryl/myristyl amidopropyl amine oxide and N-(phos-phonemethyl)iminodiacetic acid.

For example, the wettability modifier can function as a flowback additive in the well treatment fluid.

Examples of additional components that can be included in the well treatment fluid used in the method disclosed herein include friction reducing agents, clay control agents, buffers and other pH adjusting agents, biocides, bactericides, scale inhibitors, weighting materials, fluid loss control additives, bridging materials, lubricants, corrosion inhibitors, non-emulsifiers, proppant particulates (including conventional or primary proppant particulates, micro-proppant particulates, nano-proppant particulates, nanoparticle particulates, fly ash, and ceramic proppant, and gravel for forming gravel packs. As will be understood by those skilled in the art with the benefit of this disclosure, the additional components and the amounts thereof that are utilized will vary depending on the particular application in which the well treatment fluid is used. The additional components included in the well treatment fluid of the method disclosed herein, if any, will vary depending on the intended use of the well treatment fluid.

For example, the wettability modifier of the well treatment fluid can include in the range of from about 0.0001% by weight to about 60% by weight of the alkylamine oxide surfactant, and in the range of from about 0.0001% by weight to about 70% by weight of the organic compound having a phosphonoalkyl moiety, based on the total weight of the wettability modifier. For example, the wettability modifier of the well treatment fluid can include in the range of from about 0.1% by weight to about 30% by weight of the alkylamine oxide surfactant, and in the range of from about 0.1% by weight to about 35% by weight of the organic compound having a phosphonoalkyl moiety, based on the total weight of the wettability modifier. For example, the wettability modifier of the well treatment fluid can include in the range of from about 5% by weight to about 15% by weight of the alkylamine oxide surfactant, and in the range of from about 0.5% by weight to about 5% by weight of the organic compound having a phosphonoalkyl moiety, based on the total weight of the wettability modifier.

The amounts of any additional components included in the well treatment fluid of the method disclosed herein will vary depending on the intended use of the well treatment fluid.

For example, the wettability modifier can be present in the well treatment fluid in an amount in the range of from about 0.0001% by weight to about 10% by weight based on the total weight of the well treatment fluid. For example, the wettability modifier can be present in the well treatment fluid in an amount in the range of from about 0.01% by weight to about 5% by weight based on the total weight of the well treatment fluid. For example, the wettability modifier can be present in the well treatment fluid in an amount in the range of from about 0.025% by weight to about 0.5% by weight based on the total weight of the well treatment fluid. The exact amount of the wettability modifier present in the well treatment fluid used in the method disclosed herein will vary depending on, for example, the degree to which the formation is oil-wet, the presence of additional components in the well treatment fluid and the particular application.

For example, the wettability modifier can be added to the aqueous base fluid (and any other components of the well treatment fluid) to form the well treatment fluid at the site of the well. For example, the surfactant formulation can be added to the aqueous base fluid (and any other components of the well treatment fluid) to form the well treatment fluid on the fly as the well treatment fluid is pumped into the wellbore. For example, the well treatment fluid can be introduced into the formation in accordance with the method disclosed herein at a pH in the range of from 4 to 12. For example, the well treatment fluid can be introduced into the formation in accordance with the method disclosed herein at a neutral pH, for example, a pH of about 7.

The method of treating a well disclosed herein can be a method of hydraulically fracturing an oil-wet formation, wherein the well treatment fluid is a hydraulic fracturing fluid. The method disclosed herein can be used in other types of applications, including other types of stimulation treatments, as well. Examples include refract jobs, workover squeeze jobs, and enhanced oil recovery applications.

For example, in one embodiment, the method of treating a well disclosed herein is a method of hydraulically fracturing an oil-wet subterranean formation. In this embodiment, the method comprises: providing a hydraulic fracturing fluid; pumping the fracturing fluid through the wellbore into the formation at or above a sufficient pressure to form a fracture in the formation; placing proppant particulates into the fracture; and ceasing pumping of the fracturing fluid into the formation. The hydraulic fracturing fluid is the well treatment fluid described above and disclosed herein, and further comprises a plurality of proppant particulates.

Proppant particulates can be used to prop the fracture open once pumping is ceased and the hydraulic pressure on the formation is released. For example, the proppant particulates can have an average particle size in the range of from 0.1 microns to 10 millimeters. For example, the proppant particulates can be sand.

In addition, for example, the hydraulic fracturing fluid can include clay control agents, gels, gelling agents, gel stabilizers, crosslinkers, breakers, buffers, biocides, bactericides, scale inhibitors, viscosifying agents, conformance chemical additives, corrosion inhibitors including acid corrosion inhibitors and caustic corrosion inhibitors, non-emulsifiers and additional components, depending on the application.

The fracturing fluid can be provided, for example, by mixing the components of the fracturing fluid together at the site of the well as described above and known to those skilled in the art with the benefit of this disclosure. For example, the proppant particulates can be included in the fracturing fluid in an amount at least sufficient to place proppant particulates in the fracture.

The fracturing fluid can be pumped through the wellbore and into the formation at or above a sufficient pressure to form a fracture in the formation in any manner known to those skilled in the art with the benefit of this disclosure. For example, the fracturing fluid can be pumped through the wellbore and into the formation at or above a sufficient pressure to form a fracture in the formation using one or more pumps.

Proppant particulates can be placed in the fracture in any manner known to those skilled in the art with the benefit of this disclosure. For example, proppant particulates can be placed in the fracture in accordance with the disclosed method by pumping the fracturing fluid into the formation for a sufficient time and at a sufficient pressure to cause a sufficient amount of proppant particulates to be placed in the fracture. The hydraulic pressure placed on the formation forces the fracturing fluid and proppant particulates into the fracture. When the pressure is released on the fracturing fluid, the proppant particulates remain in the fracture. While in place, the proppant particulates hold the fracture open, thereby maintaining the ability for fluid to flow through the fracture to the wellbore.

Any type of primary proppant particulate known to those skilled in the art to be suitable for use in propping open primary fractures in subterranean formations can be included in the fracturing fluid. Suitable primary proppant particulates include all shapes of materials, including substantially spherical materials, low to high aspect ratio materials, fibrous materials, polygonal materials (such as cubic materials), and mixtures thereof. For example, suitable primary proppant particulates can be selected from the group of sand, walnut hulls, resin pre-coated proppant particulates, man-made proppant particulates, micro-proppant particulates, nano-proppant particulates, nanoparticle particulates, ceramic proppant, and mixtures thereof. For example, a suitable primary proppant particulate for use herein is natural sand.

For example, primary proppant particulates can be included in the fracturing fluid in accordance with the disclosed method in an amount in the range of from about 0.01 pound to about 12 pounds per 100 gallons of the fracturing fluid. For example, the primary proppant particulates can be mixed with the fracturing fluid in an amount in the range of from about 0.01 pound to about 1 pound per 100 gallons of the fracturing fluid. For example, primary proppant particulates can be mixed with the fracturing fluid in an amount in the range of from about 0.025 pound to about 0.1 pound per 100 gallons of the fracturing fluid.

Ceasing pumping of the proppant slurry into the subterranean formation in accordance with the disclosed method causes the pressure at which the proppant slurry is pumped into the formation to fall below the fracture gradient of the formation. For example, once pumping of the proppant slurry into the formation is ceased, or the pressure in the formation is otherwise caused to fall below the fracture gradient of the formation, the fracture(s) in the formation tend to close on the proppant particulates therein. The conductive channels formed by the proppant particulates allow hydrocarbons to flow through the fracture network to the wellbore and ultimately to the surface where they can be recovered.

For example, the wettability modifier functions as an effective flowback additive in the fracturing fluid.

The well treatment fluid disclosed herein is the well treatment fluid described in connection with the method disclosed herein, including all of the embodiments of the well treatment fluid set forth above.

For example, the wettability modifier of the well treatment fluid used in the method disclosed herein functions to reverse the wettability of an oil-wet subterranean formation (such as an oil-wet calcite formation) or portion thereof from oil-wet to water-wet. Such a reversal improves the recovery of oil and other hydrocarbons from the formation. Thus, in this sense, the wettability modifier functions as a flowback additive in the well treatment fluid.

As shown by the examples below, the alkylamine oxide surfactant and organic compound of the wettability modifier of the well treatment fluid disclosed herein synergistically improve the ability of the wettability modifier to reverse the wettability of an oil-wet formation or portion thereof from oil-wet to water-wet. The well treatment fluid results in a rapid modification of the wettability of the formation (or portion thereof) from oil-wet to water-wet. As a result, significantly faster production and increased ultimate recovery of oil can be achieved.

The well treatment fluid disclosed herein can also mitigate formation damage by minimizing or eliminating the negative effects and interactions of incompatible chemical aids or additives with formation mineralogy. The well treatment fluid can be used in a variety of applications. For example, the well treatment fluid can be used to compliment other surfactant formulations, flowback additives and flow enhancers such as Transcend™ permeability enhancers sold by Halliburton Energy Services, Inc.

The exemplary compositions and methods disclosed herein may directly or indirectly affect one or more components or pieces of equipment associated with the preparation, delivery, recapture, recycling, reuse, and/or disposal of the disclosed compositions. For example, and with reference to FIG. 1, the disclosed compositions and methods may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50, and resides at the surface at a well site where a well 60 is located.

In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, other optional additives can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additive source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pump and blender system 50. Such metering devices may permit the pump and blender system 50 to source from one, some or all of the different sources at a given time, and may facilitate the preparation of fracturing fluids in accordance with the present disclosure using continuous mixing or "on-the-fly" methods. Thus, for example, the pump and blender system 50 can provide just fracturing fluid into the well at some times, just proppants at other times, and combinations of those components at yet other times.

Figure 2:
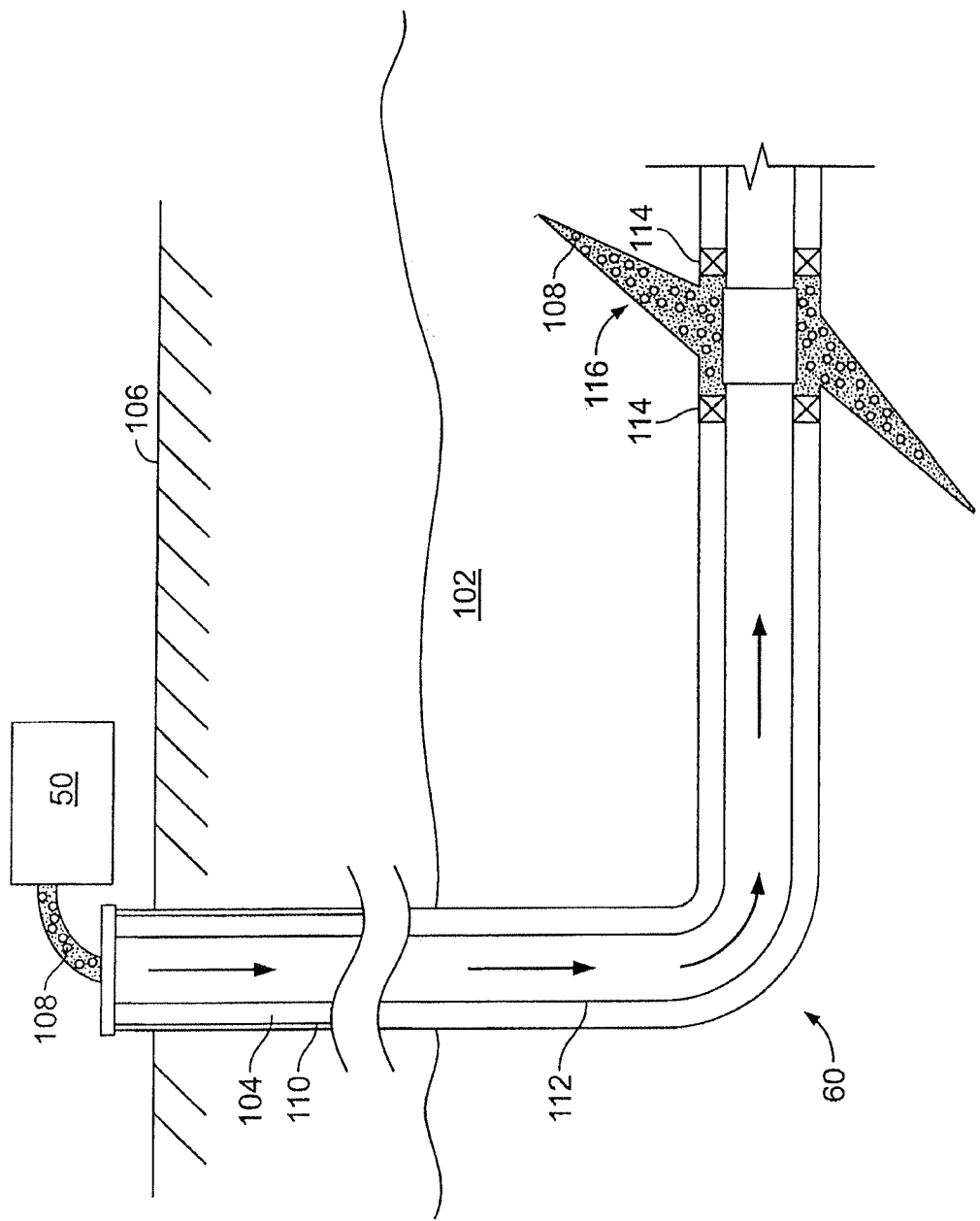
FIG. 2 is a diagram illustrating an example of a subterranean formation in which a fracturing operation can be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can also be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled to the work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example 1

Spontaneous Imbibition Experiments

Test samples consisting of Texas Cream (>98% calcium carbonate) outcrop oil-wet cores saturated with Niobrara crude oil were subjected to the wettability modifiers shown by Table 1 below:

| | |
|---|---|
| Test Sample A | a wettability modifier including:<br>(a) a brine base fluid;<br>(b) 0.2% by weight* amido amine oxide; and<br>(c) 2% by weight* of N-(phosphonomethyl)iminodiacetic acid salt. |
| Test Sample B | a wettability modifier including:<br>(a) a brine base fluid; and<br>(b) 0.2% by weight* amido amine oxide. |
| Test Sample C | a wettability modifier including:<br>(a) a brine base fluid; and<br>(b) 2% by weight* of N-(phosphonomethyl)iminodiacetic acid salt. |
| Test Sample D | a control formulation including:<br>(a) a brine base fluid; and<br>(b) 2% by weight* potassium chloride (KCl). |

*the weight percentages were based on the total weight of the surfactant formulation.

The oil-wet Texas Cream cores were prepared by first saturating the outcrop cores with Niobrara crude oil followed by aging the saturated cores at an elevated temperature for a set time period. A spontaneous imbibition assessment was then made with respect to each core. Spontaneous imbibition is the classic test for wettability (oil-wet vs. water-wet) of an oil saturated core sample. When a crude oil saturated core exhibits a water-wet character, water is the wetting phase and oil is the non-wetting phase. As a result, water can displace the oil from the core. Conversely, if the crude oil saturated core exhibits an oil-wet character, oil is the wetting phase and water is the non-wetting phase. Under oil-wet conditions, water does not provide a sufficient force to overcome the adhesion forces associated with the pore surface and crude oil and displace the oil from the core. As a result, a surfactant formulation must be effective at changing the wettability of the core from oil-wet to water-wet in order to allow water to displace oil.

Figure 3:
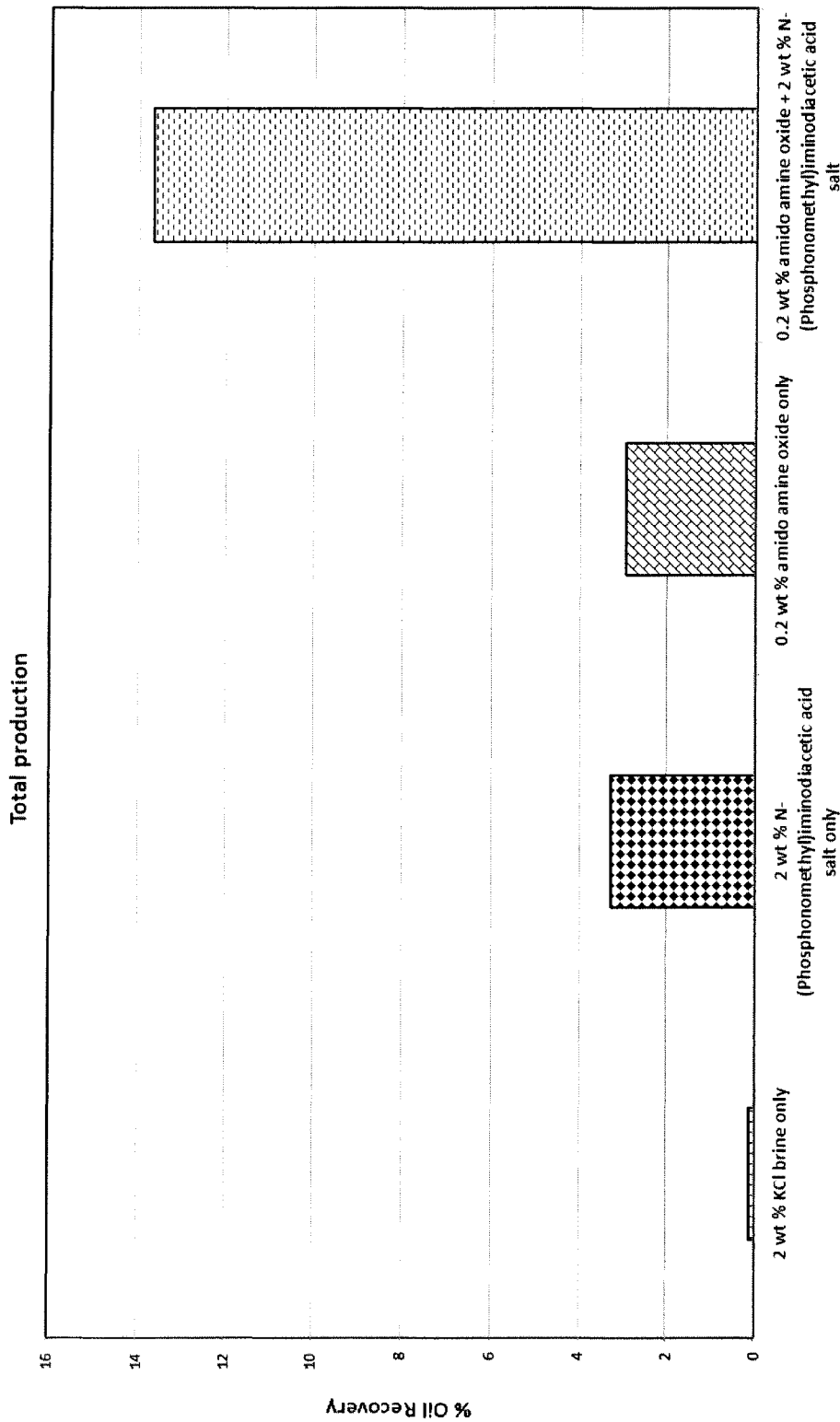
FIG. 3 is a graph showing the results of the spontaneous imbibition experiments described in Example 1 below.

The results of the tests are shown by FIG. 3. As represented, the 2% KCl brine (Test Sample D) achieved a 0.12% oil recovery. The 2% N-(phosphonomethyl)iminodiacetic acid salt (Test Sample C) achieved a 3.28% oil recovery. The 0.2% amido amine oxide (Test Sample B) achieved a 2.95% oil recovery. Finally, the 0.02% amido amine oxide together with 2% N-(phosphonomethyl)iminodiacetic acid salt (Test Sample A) achieved a 13.67% oil recovery.

As shown in FIG. 3, the inability of the 2% KCl brine (Test Sample D) to displace oil from the core suggests that the core was indeed oil-wet. Thus, both the 0.2% amido amine oxide (Test Sample B) and the 2% N-(phosphonomethyl)iminodiacetic acid salt (Test Sample C) brines did sufficiently modify the wettability of the calcite surface resulting in the displacement of hydrocarbon, albeit at a much slower rate and much lower overall production as compared to the combination of 0.2% by weight amido amine oxide and 2% by weight N-(phosphonomethyl)iminodiacetic acid salt into a single brine (Test Sample A).

Therefore, the present methods and compositions are well adapted to attain the ends and advantages mentioned, as well as those that are inherent therein. The particular examples disclosed above are illustrative only, as the present methods and compositions may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a well, comprising:
introducing a well treatment fluid through a wellbore into the subterranean oil-wet formation, said well treatment fluid including:
an aqueous base fluid; and
a wettability modifier, said wettability modifier including:
an alkylamine oxide surfactant; and
an organic compound having a phosphonoalkyl moiety;
wherein the wettability modifier reverses the wettability of at least a portion of the formation from oil-wet to water-wet thus improving the recovery of hydrocarbons.

2. The method of claim 1, wherein said alkylamine oxide surfactant is selected from the group of an alkoxylated amine, an alkoxylated alkyl alcohol, an alkoxylated ester, an alkoxylated resin, an alkoxylated alkylphenol, an alkoxylated polyol, an alkoxylated phosphonate, an alkoxylated siloxane, an alkoxylated sorbitan, an alkoxylated palmitic acid, and mixtures thereof.

3. The method of claim 2, wherein said alkylamine oxide surfactant is an alkoxylated amine.

4. The method of claim 1, wherein said alkylamine oxide surfactant is an alkylamido amine oxide.

5. The method of claim 1, wherein said organic compound has the following structural formula:

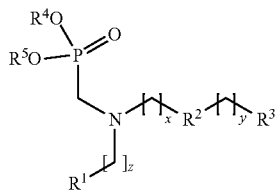

wherein:
R$^1$ is selected from the group of an alkyl having from 1 to 10 carbon atoms, an alkenyl having from 1 to 10 carbon atoms, an alkynyl having from 1 to 10 carbon atoms, an acyl, an aryl, an acetate, a phosphonate, and a hydrogen atom;
R$^2$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl amine, and a hydrogen atom;
R$^3$ is selected from the group of an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl amine, and a hydrogen atom;
R$^4$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a hydrogen atom, a Group 1 metal selected from lithium, sodium, potassium, rubidium, and cesium, a Group 2 metal selected from calcium, magnesium, beryllium, strontium, and barium, a transition metal within Group 3 through Group 12 where the metal can be one of any a divalent metal, a trivalent metal, or a tetravalent metal, a Group 13 or Group 14 metal selected from aluminum, gallium, indium, and tin, an ammonium, and a quaternary ammonium salt;
R$^5$ is selected from the group of an alkyl having from 1 to 6 carbon atoms, an alkenyl having from 1 to 10 carbon atoms, an alkynyl having from 1 to 10 carbon atoms, an acyl, an aryl, an acetate, a phosphonate, a hydrogen atom, a Group 1 metal selected from lithium, sodium, potassium, rubidium, and cesium, a Group 2 metal selected from calcium, magnesium, beryllium, strontium, and barium, a transition metal within Group 3 through Group 12 where the metal can be one of any a divalent metal, a trivalent metal, or a tetravalent metal, a Group 13 or Group 14 metal selected from aluminum, gallium, indium, and tin, an ammonium, and a quaternary ammonium salt;
x is 1 to 6;
y is 0 to 6; and
z is 0 to 6.

6. The method of claim 1, wherein said phosphonoalkyl moiety has a nitrogen-containing functional group attached thereto.

7. The method of claim 1, wherein said organic compound is a phosphorus compound selected from the group of phosphonic acids, salts of phosphonic acids, and mixtures thereof.

8. The method of claim 7, wherein said phosphorus compound is selected from the group of an aminophosphonic acid, a salt of an aminophosphonic acid, a metallated phosphonic acid, a metallated aminophosphonic acid, an ammonium salt of any preceding group member, a quaternary ammonium salt of any preceding group member, and a tertiary ammonium salt of any preceding group member.

9. The method of claim 8, wherein said phosphorus compound is selected from the group of alkyl aminophosphonates, polyaminopolyphosphonates, N-(phosphonoalkyl)iminodiacetic acids, N-(phosphonoalkyl)iminodiacetates, metallated (phosphonoalkyl)iminodiacetic acids, metallated N-(phosphonoalkyl)iminodiacetates, and mixtures thereof.

10. The method of claim 8, wherein the metal of said metallated acid is selected from sodium, potassium, lithium, cesium, beryllium, calcium, strontium, magnesium, barium, chromium, iron, manganese, nickel, copper, gallium, indium and aluminum.

11. The method of claim 10, wherein said phosphorus compound is selected from the group of an N-(phosphonomethyl)iminodiacetate, a metallated-N-(phosphonomethyl)iminodiacetate, and a mixture thereof.

12. The method of claim 7, wherein said phosphorus compound is selected from the group of N-(phosphonoalkyl)iminodiacetic acids; N-(carboxymethyl)-N-(phosphonomethyl)glycine; N,N'-1,2-ethanediylbis(N-(phosphonomethyl)glycine; glyphosine; aminotrimethylene phosphonic acid; sodium aminotris(methylenephosphonate); N-(2-hydroxyethyl)iminobis(methylphosphonic acid); P,P'-((2-propen-1-ylimino)bis(methylene))bis-phosphonic acid; P,P',P"-(nitrilotris(methylene))tris-phosphonic acid; (nitrilotris(methylene))trisphosphonic acid; ((methylimino)dimethylene)bisphosphonic acid; P,P',P",P'"-(oxybis(2,1-ethane-diylnitrilobis(methylene)))tetrakisphosphonic acid; ((propylimino)bis(methylene))diphosphonic acid; (ethylenedinitrilo)-tetramethylenephosphonic acid; ethylenebis(nitrilodimethylene)tetraphosphonic acid; (ethylenebis(nitrilobis(methylene)))tetrakisphosphonic acid; tetrasodium tetrahydrogen (ethane-1,2-diylbis(nitrilobis(methylene))) tetrakisphosphonate; 6-(bis(phosphonomethyl)amino) hexanoic acid; ((phenylmethyl)imino)bis(methylene) bisphosphonic acid; a sodium, potassium, or ammonium salt of any group member herein, and mixtures thereof.

13. The method of claim 1, wherein said organic compound is selected from the group of phosphonobutane tricarboxylic acid, 2-hydroxyphosphono dicarboxylic acid, and mixtures thereof.

14. The method of claim 1, wherein said wettability modifier of said well treatment fluid includes in the range of from about 0.0001% by weight to about 60% by weight of the alkylamine oxide surfactant, and in the range of from about 0.0001% by weight to about 70% by weight of the organic compound having a phosphonoalkyl moiety, based on the total weight of the wettability modifier.

15. The method of claim 1, wherein said wettability modifier is present in said well treatment fluid in an amount in the range of from about 0.0001% by weight to about 10% by weight based on the total weight of the well treatment fluid.

16. The method of claim 1, wherein said formation is an oil-wet calcite formation.

17. The method of claim 1, wherein said wettability modifier functions as a flowback additive in said well treatment fluid.

18. The method of claim 1, wherein said method is a method of hydraulically fracturing an oil-wet formation, and said well treatment fluid is a hydraulic fracturing fluid.

* * * * *